United States Patent [19]

Dymond et al.

[11] Patent Number: 4,670,501

[45] Date of Patent: Jun. 2, 1987

[54] POLYMERIC COMPOSITIONS AND METHODS OF USING THEM

[75] Inventors: Brian Dymond; John Langley; Malcolm Hawe, all of West Yorkshire, United Kingdom

[73] Assignee: Allied Colloids Ltd., England

[21] Appl. No.: 734,776

[22] Filed: May 16, 1985

[30] Foreign Application Priority Data

May 16, 1984 [GB] United Kingdom ............... 8412423

[51] Int. Cl.$^4$ ............................................. C08L 33/08
[52] U.S. Cl. .................................. 524/458; 524/460; 524/801
[58] Field of Search .................... 524/458, 460, 801

[56] References Cited

U.S. PATENT DOCUMENTS

| | | | |
|---|---|---|---|
| 3,788,995 | 1/1974 | Stahly | 430/114 |
| 4,059,552 | 11/1977 | Zweigle | 524/555 |
| 4,134,872 | 1/1979 | Lee | 524/460 |
| 4,138,381 | 2/1979 | Chang | 526/210 |
| 4,432,881 | 2/1984 | Evani | 524/436 |
| 4,459,378 | 7/1984 | Ugelstad | 524/458 |
| 4,460,732 | 7/1984 | Buscall | 524/458 |
| 4,530,956 | 7/1985 | Ugelstad | 524/458 |

FOREIGN PATENT DOCUMENTS 0013836 6/1980 European Pat. Off. .

*Primary Examiner*—Paul R. Michl
*Attorney, Agent, or Firm*—Ostrolenk, Faber, Gerb & Soffen

[57] ABSTRACT

Water-immiscible liquids, for example oil-based drilling fluids, are thickened by the addition of an aqueous dispersion of polymeric particles that are water-insoluble, and insoluble but swellable polymer, in the water immiscible liquid. The particles have a unswollen average diameter of less than 10 μm and at least 30% by weight are preferably in the range 0.5 to 5 μm. Preferred polymers are formed from more than 80% by weight hydrophobic monomers, preferably alkyl (meth) acrylates, and up to 20% hydrophilic monomers, preferably unsaturated carboxylic acids, preferably acrylic acid.

28 Claims, No Drawings

POLYMERIC COMPOSITIONS AND METHODS OF USING THEM

It is well known to thicken a liquid by addition of a polymeric viscosifier. In some instances it is desired to obtain viscosity that is resistant to applied shear but in many instances it is desired to obtain a viscosity that reduces with applied shear, i.e., a shear thinning composition. This is particularly useful in, for instance, drilling fluids and other compositions for use downhole.

When the liquid is aqueous, the viscosifier is often a water soluble polymeric material. It may be a natural, modified natural or synthetic polymer, for instance hydroxyethyl cellulose or high molecular weight polyacrylic acid. In U.S. Pat. No. 4,059,552, Zweigle proposed that an aqueous medium could be given high viscosity that is resistant to high shear by the use, as viscosifier, of micro beads having a size 0.2 to 4 microns and that are of a water insoluble, water swellable polymer formed of water soluble vinyl monomer with a specified amount of cross linking agent. In the examples, Zweigle forms polymers of acrylamide, often with sodium acrylate, by reverse phase polymerisation in the presence of a cross linker.

When the liquid that is to be thickened is a water immiscible liquid, for instance a hydrocarbon, the viscosifier is usually soluble in the liquid. For instance in EP No. 22982 mineral spirits are thickened by dissolving a particular acrylate copolymer therein. In Chemical Abstracts Vol. 78 30364Z, the viscosity of toluene is increased by dissolving into it a copolymer of isobutylmethacrylate with methacrylic acid. In Chemical Abstracts Vol. 83 134617D, it is proposed to dissolve various other polymers, including butadiene styrene polymer, in mineral oils to increase viscosity. The use of natural rubber latex in benzene is proposed for increasing viscosity of lubricating oil in Chemical Abstracts Vol. 82 17587N.

In GB No. 2003904, it is proposed to thicken an organic solvent by dissolving therein a copolymer of certain hydrophobic and hydrophilic monomers. The polymer must be such that it is soluble in the solvent and has a glass transition temperature of at least 30° C. Most of the examples show satisfactory copolymers of 99 parts isobutylmethacrylate with 1 part methacrylic acid but the examples also show that these proportions can lead to unsatisfactory copolymers, depending upon the polymerisation conditions. A wide variety of possible monomers are mentioned in the specification but many of them are clearly unsuitable for use as the main component of the polymer as they would give a very low glass transition temperature, far below the specified minimum of 30° C. The polymers may be made by bulk, suspension or, preferably, emulsion polymerisation and the polymer is separated as a dry product.

It is generally desired for soluble polymer thickeners to have the highest possible molecular weight as this increases their thickening effect but the viscosity attainable by the use of such polymers is still rather low.

In EP No. 106528, it is said that a latex of a neutralised sulphonate-containing styrene polymer can be used as a viscosifier in an oil-based drilling mud and that the addition of a polar cosolvent can be added to increase the solubility of the sulphonated polymer. The described products are copolymers of styrene and styrene sulphonate containing 18 to 100 meq sulphonate groups per 100 grammes of polymer. It is stated that the latex can be used as an emulsion or the polymer can be precipitated from the latex prior to use.

Doverstrand Limited of Harlow, Essex, England in their publications POL 050 and 051 September 1983 describe products under the trade names Polymul HV and Polymul LV. These products are each said to be aqueous polymer dispersions of inert hydrocarbon polymer that is soluble or swollen by aliphatic or aromatic solvents. They are each said to be fluid loss reducers in oil muds and Polymul HV is also described as a secondary viscosifier. However the data in POL 050 shows that it is an inferior viscosifier compared to organophilic clay, amine treated lignite, and asphalt. Although these products are apparently swellable by certain aliphatic or aromatic solvents, it appears that their swellability in oil based drilling muds is inadequate, their particle size is mainly below 0.5 $\mu$m and their viscosifying properties are poor.

In GB No. 2,131,067, which was published after the priority date of the present application, there are described natural rubber latices and other aqueous dispersions of polymers which are preferably hydrocarbon polymers or comprise a major proportion of copolymerised hydrocarbon. The polymers are said to dissolve in oil or swell highly in the oil. It is said that if the polymer is obtained in the form of a fine particle dispersion it is desirable to agglomerate this since coarse particle emulsions are preferred to fine particle emulsions. In one example, a copolymer of 55 parts 2-ethyl hexyl acrylate and 45 parts vinyl acetate is used as a fluid loss additive in an aqueous mud.

Despite the many proposals to thicken water immiscible liquids, for instance the oil phase of drilling muds, by polymeric viscosifiers, none of them have been found to compete satisfactorily with, for instance, amine modified bentonite. In particular, none have been found to have the desired combination of good viscosification with the desired shear thinning properties and the required thixotropy giving gel strength for particle support that are particularly desired in, for instance, drilling muds and oil-based paints.

In the invention, a water immiscible liquid is thickened by a polymeric viscosifier that comprises water insoluble polymer particles having a dry, weight average, particle size of below 10 $\mu$m and that are insoluble in the water immiscible liquid but that are swollen substantially by the liquid. Preferably at least 30% by weight of the particles are above 0.5 $\mu$m.

Thus in the invention it is essential that the particles do not dissolve but instead retain a discrete particulate structure. For the particles above 5 $\mu$m this structure can easily be observed using an optical microscope.

The particles must swell substantially in the liquid and in practice this means that their swollen volume should generally be at least 4 times, and usually at least 6 times, their dry volume. If they swell so much that the polymer tends towards full solubility, the benefits of the invention may be lessened and so generally the particles do not swell by more than 30 times, or at the most 50 times, their dry volume. Best results are generally obtained when the particles swell by from 10 to 25 times their dry volume.

The viscosifying properties are partly due to the imbibition and immobilisation of liquid in the swollen particles and partly due to particle-particle interactions and so the specified small particle size is essential. The weight average particle size is preferably below 5 $\mu$m but is normally above 0.02, preferably above 0.05, $\mu$m.

Best results are generally achieved with a weight average particle size of from 0.1 to 2 micron. Preferably at least 80%, and most preferably at least 90%, by weight of the particles have a size below 10 μm, preferably 0.05 to 5 μm and most preferably 0.1 to 4 μm.

The particles that contribute most effectively to the viscosifying effect appear to be those that are above 0.2 μm preferably above 0.4 μm, and generally below 10 μm, preferably below 5 μm. Preferably at least 30%, most preferably at least 50% by weight of the particles are in the size range 0.3 to 5, most preferably 0.5 to 3 or 4 μm. Dispersions having these size ranges are new.

The polymers are best made by dispersing polymerisable monomer or monomers in a liquid in which they are substantially insoluble and polymerising the monomer or monomers in that liquid to form a dispersion in the liquid of polymer particles having the desired particle size. This particle size can be controlled in known manner, for instance by appropriate choice of emulsifier and the amount of emulsifier. The process is conveniently referred to as emulsion polymerisation since the final particle size is always small.

The liquid in which the emulsion polymerisation is conducted is generally water and so the resultant dispersion is a dispersion of particles in a continuous aqueous phase. The water may include various additives to improve physical properties. For instance, ethylene glycol may be included to improve freeze-thaw stability.

At least 20, usually at least 30 and preferably at least 50%, by weight of the recurring groups in the polymer should be polar, and thus when the polymer is made by copolymerisation of monomers at least 50% by weight of the monomers should be polar monomers. This is surprising since the water immiscible liquid is generally non-polar. By referring to polar monomers in groups we mean groups having a significant polarity, generally caused by the inclusion of a carboxylic and/or amide group substitute on to a hydrocarbon backbone. The presence of a substantial proportion of polar groups in the polymer within the non-polar or other water immiscible liquid appears to promote the particle-particle interactions in a beneficial manner.

The presence in the polymer of a high proportion of aromatic hydrocarbon groups tends to make it difficult, or impossible, to obtain the desired combination of particle-particle interaction, insolubility and swellability and so the monomers from which the polymer is formed should not contain above 30% aromatic hydrocarbon monomers and preferably are substantially free, and most usually totally free, of aromatic hydrocarbons.

Although it appears necessary to include polar monomers for best results, it is necessary that at least most of the polar monomers are hydrophobic, as otherwise the polymer will be water soluble and/or non-swellable in the water immiscible liquid. However the presence of a small amount of hydrophilic monomers appears desirable. By hydrophilic we mean that the monomer has a solubility of above 3% by weight in water at room temperature and by hydrophobic we mean that it has solubility of below 3% by weight in water at room temperature (20° C.). The preferred polymers are formed from 0 to 20% by weight hydrophilic monomers, 25 to 100% by weight polar hydrophobic monomers and 0 to 75% by weight non-polar hydrophobic monomers. If the amount of non-polar hydrophobic monomer is above 30%, then it will generally consist of ethylene and preferably the only non-polar hydrophobic monomers included in the polymers of the invention is ethylene. Best results are generally obtained when the amount of polar hydrophobic monomers is from 50 to 100%, most preferably 80, and often 90, to 100% by weight.

Suitable polar hydrophobic monomers include alkyl (meth) acrylates, the monoesters or diesters of dibasic ethylenically unsaturated acids such as alkyl itaconates, alkyl maleates (e.g., the half ester of stearyl alcohol with maleic anhydride) and alkyl fumarates and vinyl esters of long chain acids, such as vinyl stearate, laurate and versatate. Hydrophobic N-alkyl substituted (meth) acrylamides may be used. Preferably at least 50% by weight, and most preferably at least 80% by weight of the monomers are (meth) acrylic monomers, generally alkyl acrylate monomers. The hydrophobic monomers preferably include an alkyl group that contains up to 30 carbon atoms, preferably 6 to 18 and most preferably 6 to 10 carbon atoms. Particularly preferred are copolymers of 90 to 100% by weight $C_{1-30}$ alkyl (meth) acrylate and 0 to 10% by weight hydrophilic monomer, especially those wherein the polymer contains 40 to 100% by weight $C_{6-10}$ alkyl acrylate.

A particularly preferred monomer is 2-ethyl hexyl acrylate. Valuable polymers are formed from 40–100% of this, 0–10% hydrophilic groups and other $C_{6-30}$ alkyl (meth) acrylate, preferably 0–50% $C_{12-18}$ alkyl (meth) acrylate.

Other polar hydrophobic monomers that may be used include vinyl acetate, for instance copolymerised with ethylene and/or vinyl versatate.

The polymer particles used in the invention preferably have a relatively hydrophilic coating as this seems to promote particle-particle interactions within the water immiscible and generally non-polar liquid. The hydrophilic coating may be an external coating of, for instance, an emulsifier or some other material present during the polymerisation but preferably is formed by copolymerisation of hydrophilic monomer. The hydrophilic monomer may be any monomer that will provide polar oxygen containing or nitrogen containing groups on the surfaces during the polymerisation or in some other way. Suitable hydrophilic comonomers that may be used include dialkyl amino alkyl (meth) acrylates and their quaternary addition and acid salts, acrylamide, N-(dialkyl amino alkyl) acrylamide and meth acrylamides and their quaternary addition and acid salts, hydroxy alkyl (meth) acrylates and sulphonic acids such as vinyl sulphonic acid (as the free acid or, preferably, the alkyl amino salt) or unsaturated carboxylic acids such as methacrylic acid or, preferably acrylic acid, generally as the free acid but possibly as an alkyl amino salt. Other preferred monomers include hydroxyethyl (or propyl) acrylate, acrylamide and dimethylaminoethylmethacrylate (generally as a quaternary salt).

If the hydrophilic monomers are present in too great an amount, it may difficult to obtain the desired small particle size. Accordingly the amount of the hydrophilic polymer is generally below 20% and preferably below 5%. The amount is normally at least 0.05%, preferably at least 0.1% and most preferably at least 0.5%. Particularly preferred polymers are those obtained using acrylic acid, preferably in an amount of 0.3 to 3%, as a copolymer with other monomers that are mainly alkyl (meth) acrylate, preferably mainly $C_{6-10}$ alkyl acrylate monomers.

The polymers useful in the invention preferably have a glass transition temperature (Tg) below about 25° C., often below 10° C. and most preferably below 0° C. Best results are generally obtained when Tg is below −20° C., most preferably in the range −40° to −70° or −75° C.

The polymers used in the invention are preferably film forming at 20° C., that is to say if the dispersion of the polymer is cast on a surface at room temperature the polymer will form a film.

The preferred polymers have >30% particles in the range 0.5 to 5μ, are film forming at 20° C., swell to at least 4 times, preferably 10 to 20 times, their volume in the water immiscible liquid, and are formed mainly of hydrophobic polar monomers, optionally with ethylene, and preferably with 0.2 to 5% of a water soluble, hydrophilic, monomer. Emulsions containing these are novel.

The polymer particles preferably remain in the aqueous dispersion in which they are formed prior to incorporation with the water immiscible liquid and should not be dried or otherwise separated from the dispersion. With the preferred film forming, low Tg, polymers, it would be difficult or impossible to separate the particles while retaining the desired small particle size. If polymers having higher Tg values were obtained, separation might be possible but the resultant product would be very dusty and difficult to handle. However, even apart from this, we find that the viscosifying characteristics of the polymer are reduced if the polymer is separated from the aqueous dispersion prior to use.

The polymer is preferably formed from monomers such that, without additional cross linking agent, it has the desired combination of swellability and insolubility in the water immiscible liquid. However if a chosen combination of, for instance, polar acrylate monomers and acrylic acid results in the polymer being too swellable, or perhaps even soluble, then multi-functional cross linking monomer may be added so as to render the polymer truly cross linked. The cross linking monomer will generally be a hydrophobic cross linking monomer such as diallyl phthalate. Any of the known multi-ethylenically unsaturated hydrophobic cross linking agents can be used in place of diallyl phthalate. The amount of cross linking agent, if added, is generally in the range 0.01 to 2%, preferably 0.2 to 0.8% by weight of the monomers. In general, we find best results are obtained without the addition of cross linking agent. It is surprising that substantially linear polymers formed mainly of acrylic or other polar groups are superior to, for instance, cross linked polymers formed mainly or wholly of hydrophobic hydrocarbon groups since it might have been expected that these cross linked hydrocarbon polymers would have a far greater effectiveness as thickening agents in hydrocarbon or other non-polar liquids.

The aqueous dispersions used in the invention may be made by conventional oil-in-water emulsion polymerisation, for instance by dispersing the monomer or blend of monomers into water in the presence of an oil-in-water emulsifier or surfactant, for instance using a high speed Silverson mixer, and may contain an appropriate polymerisation initiator. Polymerisation may be initiated in conventional manner, for instance by thermal or redox initiator. Although it is often considered that anionic emulsifiers are the most effective in such polymerisations, we have found in the invention that it is particularly desirable to use non-ionic emulsifiers. These seem to promote the formation of the preferred particle size distribution. Accordingly a liquid aqueous composition according to the invention contains dispersed polymer particles wherein the polymer is formed from ethylenically unsaturated monomers of which at least 80% by weight are hydrophobic and up to 20% by weight are hydrophilic provided that not more than 30% of the monomers are aromatic, the particles are water insoluble polymer particles having a dry, weight average, particle size of below 10 μm and are insoluble but swellable by water immiscible liquids, and the composition contains 2 to 20%, by weight based on the weight of polymer, of a non-ionic surfactant.

Suitable non-ionic surfactants are alkoxylates of long chain alcohols or, preferably, alkoxylates of alkyl phenols, wherein the alkoxy groups are preferably ethoxy and the alkyl groups are preferably nonyl, although some propoxy substitution is sometimes useful, as sometimes are substituted octyl phenols.

The invention includes a method in which the aqueous dispersion of polymer particles, made by emulsion polymerisation, is added to the water immiscible liquid in order to viscosify that liquid.

The water-immiscible liquid can be any hydrophobic solvent having a solubility in water of less than 5% by weight. It may be a chlorinated hydrocarbon but is generally a mineral oil or other hydrocarbon. It may be a refined hydrocarbon such as kerosene, white spirit or aviation fuel or may be an unrefined hydrocarbon such as crude oil. It may be the oil of an oil based paint, in order to provide a paint of improved rheology. It is generally non-polar. It may be the continuous phase of a water in oil emulsion.

We have surprisingly found that when adding the aqueous dispersion of viscosifying polymer particles to the water-immiscible liquid, optimum viscosification sometimes may not occur unless deliberate steps are taken to ensure contact between the water-immiscible liquid and the polymer particles. It appears that the desired hydrophilic coating around the particles carries a protective water layer and that this may inhibit viscosification of the water-immiscible liquid unless it is removed. It may be removed by dehydration, agitation or emulsification. Thus mechanical agitation may be sufficient to achieve optimum viscosification. Alternatively the addition of water-in-oil emulsifier, that may be anionic, non-ionic or cationic, for instance a blend of anionic and cationic emulsifiers, may be useful. This emulsifier may be present either in the dispersion or in the water-immiscible liquid. Dehydrating agent that may be used may be present in the water-immiscible liquid, for instance calcium chloride may be present. Instead of chemical absorption, the water may also be removed by distillation. Cosolvent can be used to promote thickening, alone or in conjunction with surfactants.

The total amount of polymer particles that are added is generally in the range 0.3 to 10%, preferably 0.5 to 5% by weight of the total composition. The amount of particles having the preferred size range (e.g., 0.3 to 5 μm) is preferably 0.2 to 7%, most preferably 0.3 to 4% by weight of the total composition.

The invention is of particular value when the water-immiscible liquid is the continuous phase of a water-in-oil emulsion. The polymer is insoluble and unswellable in the water phase but rapidly provides the desired rheology modification, and in particular increasing viscosity, of the organic phase.

Particularly good thickening effects are achieved when inorganic particulate solid is present in the resultant composition, and in particular when such solid is dispersed in a water-in-oil emulsion to which the polymer dispersion is added. Amine-modified bentonite is a conventional thickener for such systems and the combination of amine-modified bentonite with the polymer dispersions gives particularly good thickening results. Other particulate solids that give good results include barytes and drilled rock, such as is present in drilling mud compositions.

Thickened liquids according to the invention have a particularly desirable shear-thinning rheology. They are highly viscous at low shear but are less viscous, but still have useful viscosity, at high shear. A gel strength is provided by a developed thixotropy which usefully supports suspended particles. They are therefore extremely valuable as viscosifiers in invert or oil based drilling fluids, completion fluids, packer fluids, stimulation fluids, fracturing fluids lost circulation and pipeline pigging fluids. The compositions are also useful for thickening the oil phase of various dispersions of particles in oil, especially dispersions of dry polymer particles or aqueous polymer gel particles.

The following are examples of the invention.

EXAMPLE 1

An emulsion of 297 parts by weight 2-ethylhexyl acrylate and 3 parts by weight glacial acrylic acid was formed in 300 parts water and 24 parts oil in water surfactant (nonyl phenol ethylene oxide condensate). 165 parts water containing 6 parts of the surfactant and 0.4 parts thermally decomposing free radical initiator (ammonium persulphate) were heated in a rection vessel to 80° C. and the emulsion and a further 0.4 parts free radical initiator in 30 parts water were separately added to the vessel over a period of 3 hours. After the additions were complete, the vessel was held at 80° C. for a further 30 minutes and the product was then allowed to cool to room temperature. The product was a dispersion in water of polymer particles having weight average dry size of about 0.5 $\mu$m, and mainly in the range 0.1 to 2 $\mu$m, with >30% in the range 0.5 to 4$\mu$. The product was designated Sample A in the following examples.

EXAMPLE 2

Various amounts of product A were mixed into kerosene in the presence of a suitable activator. The results are given in Table 1.

TABLE 1

| Polymer Concentration (% active) | Spindle | Brookfield Solution Viscosity as a function of Spindle Speed (rpm) | | | | |
|---|---|---|---|---|---|---|
| | | 0.5 | 1.0 | 5.0 | 20.0 | 100.0 |
| 7.5 | 6 | 230,000 | 140,000 | 96,000 | 16,500 | 5150 |
| 5.0 | 6 | 64,000 | 38,000 | 14,000 | 2,600 | 810 |
| 2.5 | 3 | 14,000 | 12,000 | 9,600 | 2,250 | 720 |

The results show the remarkable thickening effect which such polymers have in hydrophobic solvents. The apparent viscosity is also very dependent upon the shear rate used during viscosity measurement.

EXAMPLE 3

A drilling fluid is formed of

| Low toxicity mineral oil | 224 mls |
|---|---|
| 21.4% CaCl$_2$ Solution | 72.1 g |
| Emulsifier | 7 g |
| Fluid Loss Agent | 10 g |
| Lime | 5 g |
| Wetting Agent | 1 cc |
| Barite | 243 g |

The mud characteristics of 3 such drilling fluids were determined. One fluid had no additive. Another fluid included 1.5% active polymer of Product A. Another fluid contained 3% organophilic clay, but this suffered from the disadvantage that it required extended mixing to achieve full activation. The results are given in Table 2.

TABLE 2

| Additive | PV (cP) | YP (lb/100 ft$^2$) | AV (cP) | Gels | | EBV (volts) |
|---|---|---|---|---|---|---|
| | | | | 10" | 10' | |
| None | 15 | −0.5 | 14.75 | 2 | 2 | 324 |
| Product A | 34 | 33 | 50.5 | 19.5 | 29 | 744 |
| Clay | 42 | 22 | 53 | 16 | 29 | 843 |

The beneficial effect of Product A is clearly apparent.

EXAMPLE 4

A drilling fluid was prepared in the manner described in Example 3. Two products, base on styrene/butadiene resins, which are recommended as viscosity modifiers for oil based drilling fluids were evaluated in comparison with Product B. This product was prepared in the manner described in Example 1 for Product A except that only 12 parts of surfactant were used during the preparative stage. When examined under an optical microscope, the Polymul products appeared substantially free of particles above 0.5 $\mu$m and appeared not to be swollen significantly.

Each product was evaluated at a dose of 1.5% active polymer. The results are given in Table 3.

TABLE 3

| Additive | Unswollen Particle Size $\mu$m | PV (cP) | YP (lbs/100 ft$^2$) | AV (cP) | GELS | | EBV (volts) |
|---|---|---|---|---|---|---|---|
| | | | | | 10" | 10' | |
| Product B | >40% 0.5–4 | 47 | 75 | 84.5 | 27 | 40 | 689 |
| Polymul HV | <.5 | 52 | 2.5 | 53.25 | 3 | 4 | 503 |
| Polymul LV | <.5 | 26 | 0 | 26 | 2 | 2 | 473 |

The superior effectiveness of Product B can clearly be seen.

EXAMPLE 5

A drilling fluid was prepared in the manner described in example 3. The characteristics of drilling fluids containing the following viscosifiers at doses of 5 ppb active polymer were determined.

C is a copolymer of 2-ethyl hexyl acrylate: acrylic acid 99:1

D is a copolymer of 2-ethyl hexyl acrylate: acrylic acid 99:1, cross-linked with 500 ppm diallyl phthalate.

E is a terpolymer of 2-ethyl hexyl acrylate: n-butylacrylate: acrylic acid 84:15:1

F is a terpolymer of 2-ethyl hexyl acrylate:lauryl methacrylate:acrylic acid 79:20:1

G is a terpolymer of 2-ethyl hexyl acrylate:stearyl methacrylate:acrylic acid 79:20:1
H is a copolymer of N-decyl acrylamide: acrylic acid 99:1
I is 2-ethyl hexyl acrylate
J is a terpolymer of 2 ethyl hexyl acrylate: lauryl methacrylate: acrylic acid 50:49:1
K is 19% vinyl versatate, 80% 2 EHA, 1% acrylic acid
L is 39% vinyl versatate, 60% 2 EHA, 1% acrylic acid
M is 99% 2 EHA, 1% acrylamide
N is 99% 2 EHA, 1% hydroxypropyl acrylate

| Product | PV (cP) | YP (lb/100 ft$^2$) | AV (cP) | GEL 10″ | GEL 10′ | EBV (volts) |
|---|---|---|---|---|---|---|
| C | 51 | 80 | 91 | 39 | 50 | 946 |
| D | 36 | 15 | 43.5 | 4 | 22 | 983 |
| E | 34 | 19 | 43.5 | 2.5 | 3 | 691 |
| F | 75 | 75 | 112.5 | 34 | 51 | — |
| G | 53 | 49 | 77.5 | 16 | 28 | — |
| H | 45 | 4 | 47 | 3 | 3 | 639 |
| I | 33 | 10 | 38 | 4 | 21 | 784 |
| J | 49 | 8 | 53 | 2 | 2 | 765 |
| K | 43 | 54 | 70 | 23 | 44 | 1146 |
| L | 45.5 | 53 | 72 | 25 | 36 | 1082 |
| M | 45 | 18 | 54 | 7 | 28 | 1204 |
| N | 39.5 | 22 | 50.5 | 10 | 30 | 1219 |
| Blank | 21 | −4 | 19 | 1 | 1.5 | 350 |

Comparison of C with I shows the benefit of including acrylic acid. Comparison of C with D shows that when the polymer is otherwise satisfactory, it is undesirable to crosslink. Comparison of J with F shows that including too much of a very long chain methacrylate is undesirable as it appears to make the product too swellable and tending towards solubility. The best results are those for products C, F, and J to N. However all the products shown in the table do give useful properties.

EXAMPLE 6

Solid polymer was extracted from Product A by drying overnight at 95° C. The resultant polymer dried into a lump.

Three drilling fluids were prepared according to the recipe in Example 3. Product A was added to one of them. The dried polymer obtained from Product A was added to another. To a third, the dried polymer was incorporated into the mineral oil of the drilling fluid for 24 hours before incorporating the other ingredients of the drilling fluid (to give time for swelling of the polymer by the oil). The properties of the drilling fluid to which Product A had been added were very satisfactory. The properties of the drilling fluid prepared by adding dried polymer to the oil for 24 hours before adding the other ingredients were very much worse, and the properties of the drilling fluid to which dried polymer had been added at the time of mixing the other ingredients were even worse. This demonstrates the value of maintaining the polymer as discrete particles in the aqueous dispersion in which they are formed, in preference to separating the particles from the dispersion.

EXAMPLE 7

A further use of the invention is to increase the stability due to settlement of dispersions of water soluble polymer particles such as polyacrylamides in an organic continuous phase, such as a mineral oil. Thus, 500 g of a 50% w/w slurry of polyacrylamide microbeads (20–50 μm in diameter) in Pale Oil 60 was prepared by suspension polymerisation. 32.9 g of 38% oil-in-water emulsion of a 99/1 2-ethylhexyl acrylate/acrylic acid copolymer and 10 g Tween 81 (Trade mark, sorbitan monooleate with 5 ethylene oxide units) was added to the slurry with vigorous stirring. The resultant product was a mobile viscous slurry which rapidly dispersed in water to give a 1% polyacrylamide solution. No signs of settlement or separation were observed over a period of 21 days compared with marked settlement within 24 hours of a product prepared in the absence of the polymer emulsion.

We claim:

1. A water-immiscible liquid thickened by water insoluble polymer particles having a dry weight average particle size of below 10 μm and that are insoluble in the water-immiscible liquid but are swollen by the liquid and that comprise a polymer which has a glass transition temperature of less than about 25° C. and formed from monomers of which 80–100% are hydrophobic and 0–20% are hydrophilic, in which at least 25% of the monomers are both polar and hydrophobic and in which not more than 30% of the monomers are hydrophobic aromatic hydrocarbon monomers, all percentages being by weight of total monomer.

2. A liquid according to claim 1 in which the particles are swollen to 4 to 50 times their dry volume.

3. A liquid according to claim 1 in which at least 30% by weight of the particles have an unswollen size of 0.05 to 5 μm.

4. A liquid according to claim 1 in which the polymer is formed from 80 to 100% $C_{1-30}$ alkyl (meth) acrylate monomers of which 50% to 100% are $C_{6-18}$ alkyl (meth) acrylate monomers, and 0 to 20%, by weight hydrophilic monomers.

5. A liquid according to claim 1 in which the polymer is formed from 90 to 100% alkyl (meth) acrylate of which at least 50% by weight is $C_{6-10}$ alkyl (meth) acrylate, and 0.5 to 10%, by weight water soluble monomer.

6. A liquid according to claim 1 in which the particles are formed of a copolymer of ethylenically unsaturated monomers and have an external hydrophilic shell formed of a monomer that is hydrophilic but that is miscible with the other monomer or monomers in the copolymer.

7. A liquid according to claim 1 in which the polymer is formed from monomers that include 0.1 to 5% of a hydrophilic monomer selected from unsaturated carboxylic acids, acrylamide, dialkylaminoalkyl (meth) acrylates and hydroxyalkyl (meth) acrylates.

8. A liquid according to claim 1 in which the polymer is substantially uncross-linked.

9. A liquid according to claim 1 in which the polymer has a glass transition temperature of less than −20° C.

10. A liquid according to claim 1 in which the polymer is film forming at 20° C.

11. A liquid according to claim 1 in which the polymer particles have been formed by emulsion polymerisation.

12. A liquid according to claim 1 in which the polymer particles have been made by emulsion polymerisation and the liquid has been formed by adding to the water-immiscible liquid the resultant aqueous emulsion of the polymer particles.

13. A liquid according to claim 1 and that is a downhole fluid that is a water-in-oil emulsion.

14. A liquid according to claim 1 in which at least 50% of the monomers are both polar and hydrophobic.

15. A liquid according to claim 14 in which at least 80% of the monomers are both polar and hydrophobic.

16. A liquid according to claim 1 that is the continuous phase of a dispersion of polymer particles.

17. A liquid according to claim 1 in which the polar and hydrophobic monomers are ethylenically unsaturated monomers carrying a carboxylic ester group or amine group substituent and that have a solubility of below 3% by weight in water at 20° C.

18. A liquid according to claim 1 in which the hydrophobic monomers are selected from ethylene and polar hydrophobic monomers which are ethylenically unsaturated monomers carrying a carboxylic ester group or amide group substituent and that have a solubility of below 3% by weight in water at 20° C.

19. A liquid according to claim 1 in which the hydrophilic monomers are selected from dialkyl amino alkyl (meth) acrylate and their quaternary addition and acid salts, acrylamide, N-(dialkyl amino alkyl) acrylamide and meth acrylamide and their quaternary addition and acid salts, hydroxy alkyl (meth) acrylates and unsaturated sulphonic or carboxylic acids and their alkyl amino salts.

20. A liquid according to claim 1 in which the polymer is formed from 40–100% 2-ethyl hexyl acrylate, 0–10% hydrophilic groups and 0–50% $C_{6-30}$ alkyl (meth) acrylates.

21. A liquid according to claim 1 in which the polymer is formed from 40–100% 2-ethyl hexyl acrylate, 0–10% hydrophilic groups and 0–50% $C_{12-18}$ alkyl (meth) acrylates.

22. A liquid according to claim 1 in which the monomers include 0.3–3% acrylic acid.

23. A liquid according to claim 5 in which the $C_{6-10}$ alkyl (meth) acrylate is 2-ethyl hexyl acrylate.

24. A liquid according to claim 7 in which the unsaturated carboxylic is acrylic acid.

25. A liquid according to claim 12 in which the emulsion polymerisation was conducted in the presence of a nonionic oil-in-water emulsifier.

26. A liquid according to claim 12 in which water has been removed from around the said water insoluble polymer particles after addition of the aqueous emulsion to the water-immiscible liquid.

27. A liquid according to claim 1 in which the liquid has been formed by adding to the water-immiscible liquid an emulsion of the polymer particles.

28. A water-immiscible liquid thickened by water insoluble polymer particles having a dry weight average particle size of below 10 µm and that are insoluble in the water-immiscible liquid but are swollen to 4 to 50 times their dry volume by the liquid, and that comprises a polymer which has a glass transition temperature of less than about 25° C., said polymer particles having been made by emulsion polymerisation of from 80 to 100% $C_{1-30}$ alkyl (meth)acrylate monomers of which 50 to 100% are hydrophobic $C_{6-18}$ alkyl (meth)acrylate monomers and 0 to 20% are hydrophilic monomers, in which at least 25% of the monomers are both polar and hydrophobic, and in which not more than 30% of the monomers are hydrophobic aromatic hydrocarbon monomers, all percentages being by weight of total monomer, and said liquid having been formed by adding to the water-immiscible liquid the resultant aqueous emulsion of the polymer particles.

* * * * *